United States Patent
Kim et al.

(10) Patent No.: US 10,608,225 B2
(45) Date of Patent: Mar. 31, 2020

(54) MICRO-POROUS HYBRID FILM HAVING ELECTRO-CHEMICAL STABILITY AND METHOD FOR PREPARING THE SAME

(71) Applicants: SK Innovation Co., Ltd., Seoul (KR); SK IE Technology Co., Ltd., Seoul (KR)

(72) Inventors: Yong Kyoung Kim, Daejeon (KR); Dong Jin Joo, Daejeon (KR); Young Jun Woo, Daejeon (KR); Jae Woong Kim, Daejeon (KR); Kyu Young Cho, Daejeon (KR); Jung Moon Sung, Daejeon (KR); Dong Man Cho, Daejeon (KR)

(73) Assignees: SK Innovation Co., Ltd., Seoul (KR); SK IE Technology Co., Ltd., Seoul (KR)

( * ) Notice: Subject to any disclaimer, the term of this patent is extended or adjusted under 35 U.S.C. 154(b) by 35 days.

(21) Appl. No.: 15/836,111

(22) Filed: Dec. 8, 2017

(65) Prior Publication Data
US 2018/0102525 A1 Apr. 12, 2018

Related U.S. Application Data

(62) Division of application No. 14/758,369, filed as application No. PCT/KR2013/011998 on Dec. 23, 2013, now Pat. No. 9,853,273.

(30) Foreign Application Priority Data

Dec. 28, 2012 (KR) .................. 10-2012-0156548

(51) Int. Cl.
*H01M 2/16* (2006.01)
*H01M 2/14* (2006.01)

(52) U.S. Cl.
CPC .......... *H01M 2/1686* (2013.01); *H01M 2/14* (2013.01); *H01M 2/145* (2013.01); *H01M 2/1646* (2013.01); *H01M 2/1653* (2013.01)

(58) Field of Classification Search
CPC ...... H01M 2/1686; H01M 2/14; H01M 2/145; H01M 2/1646; H01M 2/1653
See application file for complete search history.

(56) References Cited

U.S. PATENT DOCUMENTS

| | | | |
|---|---|---|---|
| 2002/0071915 A1* | 6/2002 | Schubert | H01M 2/145 427/385.5 |
| 2002/0092155 A1 | 7/2002 | Carlson et al. | |
| 2008/0292968 A1* | 11/2008 | Lee | H01M 2/14 429/247 |
| 2012/0115009 A1 | 5/2012 | Okuno et al. | |
| 2013/0017432 A1* | 1/2013 | Roumi | H01M 2/1686 429/145 |
| 2013/0287937 A1 | 10/2013 | Joo et al. | |

FOREIGN PATENT DOCUMENTS

| | | |
|---|---|---|
| CN | 101420019 A | 4/2009 |
| JP | 2002355938 A | 12/2002 |
| JP | 2004227972 A | 8/2004 |
| JP | 2005276503 A | 10/2005 |
| KR | 1020070080245 A | 8/2007 |
| KR | 1020120015729 A | 2/2012 |
| WO | 2005049318 A1 | 6/2005 |
| WO | 2008029922 A1 | 3/2008 |

* cited by examiner

*Primary Examiner* — Raymond Alejandro
(74) *Attorney, Agent, or Firm* — The Webb Law Firm

(57) ABSTRACT

Provided are a micro-porous hybrid film and a method for preparing the same, and more particularly, a micro-porous hybrid film capable of improving reliability of a battery by simultaneously improving thermal stability at a high temperature and water properties, and a method for preparing the same. In addition, the present invention relates to a micro-porous hybrid film suitable for a separator of a high capacity/high output lithium secondary battery capable of increasing production stability, long term stability, and performance of the battery by improving adhesive force between a micro-porous film and a coating layer and permeability and minimizing a water content by the coating layer.

6 Claims, 2 Drawing Sheets

MICRO-POROUS HYBRID FILM HAVING ELECTRO-CHEMICAL STABILITY AND METHOD FOR PREPARING THE SAME

CROSS REFERENCE TO RELATED APPLICATIONS

This application is a divisional of U.S. patent application Ser. No. 14/758,369, filed on Jun. 29, 2015, now U.S. Pat. No. 9,853,273, which is a United States national phase of International Application No. PCT/KR2013/011998 filed Dec. 23, 2013, and claims priority to Korean Patent Application No. 10-2012-0156548 filed Dec. 28, 2012, the disclosures of which are hereby incorporated in their entirety by reference.

BACKGROUND OF THE INVENTION

Field of the Invention

The present invention relates to a micro-porous hybrid film and a method for preparing the same, and more particularly, to a micro-porous hybrid capable of simultaneously improving thermal stability at a high temperature and water properties to improve reliability of a battery, and a method for preparing the same.

In addition, the present invention relates to a micro-porous hybrid film suitable for a separator of a high capacity/high output lithium secondary battery capable of significantly improving stability of a coating layer to increase production stability and long term lifetime characteristics of the battery.

Description of Related Art

A micro-porous film has been widely used as various battery separators, a separation filter, a micro-filtration membrane, and the like, due to chemical stability and excellent properties thereof. Among them, a separator for a secondary battery has internal pores capable of transferring ions together with a function of spatially blocking a cathode and an anode from each other. Recently, in accordance with high capacity and high output of the secondary battery, as one of the methods for improving electric stability of the battery, a demand for improving the characteristics of the separator has been further increased. In the case of a lithium secondary battery, when thermal stability of the separator is decreased, a risk of overheating, ignition, or explosion of the battery may be present due to a short circuit between electrodes generated together with damage or deformation of the separator caused by a temperature increase due to abnormal behavior of the battery.

Recently, under a condition requiring high output/high capacity of the battery such as an information technology (IT), an electric drive vehicle (EDV), an electric power tool, an energy storage system (ESS), or the like, since ignition possibility and explosion possibility that will be generated at the time of abnormal behavior of the battery may be several times to several ten times higher than those of the existing battery, thermal stability of the separator capable of handling the temperature rise of the battery has been urgently required. The separator having excellent thermal stability means a separator capable of serving to block damage of the separator at a high temperature to thereby block direct short-circuit between electrodes. For example, when a short (short circuit) is generated due to dendrite formed during a charging and discharging process of a battery or foreign materials, heating of the battery may be generated, and in this case, generation of ignition/explosion, or the like, may be suppressed by preventing deformation of the separator.

A polyolefin based micro-porous hybrid film using a high heat-resistance resin has been disclosed in Japanese Patent Laid-Open Publication No. 2002-355938. The high heat-resistance resin is coated on a polyethylene based micro-porous film layer by a phase separation method, but it is difficult to implement efficient permeability by using a resin alone to form pores through phase separation, and a degree of phase separation and uniformity may be significantly changed according to drying conditions such as humidity, temperature, and the like, such that there is limitations in producing a separator having excellent quality uniformity. In addition, there is a problem in that shrinkage of the micro-porous film due to a rapid temperature increase at the time of the abnormal behavior of the battery such as the short circuit may not be effectively blocked. Since heat-resistance of a coating layer is excellent and thermal deformation of the coating layer itself is not generated at 130° C., which is a melting point of the micro-porous film, the shrinkage of the micro-porous film may be partially blocked. However, since resistance is insufficient to completely block the shrinkage of the micro-porous film due to a loose net structure of a polymer resin configuring the coating layer, this method is not suitable for preparing a separator having improved thermal stability.

A method of improving heat resistance of a separator and thermal stability of a battery by introducing a polyvinylidene fluoride copolymer, which is a heat resistance resin, as a coating layer has been disclosed in Korean Patent Laid-Open Publication No. 2007-0080245 and International Patent Laid-Open Publication No. WO2005/049318, but there is a limitation in improving thermal stability of the battery in that the coating layer is easily dissolved or gelated in an electrolyte.

In most of the methods of improving heat resistance, a process of forming a coating layer using a heat resistance resin using an organic solvent is applied. In this case, in order to dissolve the heat resistance resin, a large amount of organic solvent is used. In the case of using the organic solvent, there are disadvantages in that economic efficiency may be deteriorated due to a process of recovering or burning up the solvent after coating and drying and this method is not eco-friendly. In addition, the organic solvent has excellent affinity for the micro-porous film, such that the organic solvent may be absorbed in pores of the micro-porous film during a coating process. Due to the features as described above, in the case of forming a coating layer using a solution in which the heat resistance resin is dissolved, after a drying process, the inside of the pores of the micro-porous film is coated with the heat resistance resin. In the micro-porous film coated with the heat resistance resin, a pore size is decreased, such that permeability may be decreased. In addition, when a shutdown function of the micro-porous film is exhibited at a high temperature, the shutdown function may be hindered by the heat resistance resin coated in the pores. In the case of improving heat resistance using the organic solvent, since there is a factor of inhibiting a basic function of the micro-porous film as well as environmental problems, advantages to be obtained by coating a heat resistance layer may be offset. In addition, even in the case of using the heat resistance resin, swelling and melting may be generated in an organic electrolyte, and particularly, the heat resistance resin is swelled and melted in an electrolyte at a high temperature of 120° C. or more, such that the heat resistance resin strongly tends to be separated from the micro-porous film. Therefore, even though a heat resistance property of the heat resistance resin is excellent, it is difficult to exhibit the heat resistance property.

A method of using water as a solvent at the time of the coating process has been disclosed in Japanese Patent Laid-Open Publication Nos. 2004-227972 and 2005-276503. However, in the case of using this water soluble polymer, since the polymer itself has high affinity for water, there is a disadvantage in that a large amount of water capable of having a negative influence on performance of the battery may remain in the coating layer after drying. The micro-porous hybrid film having a high water content may deteriorate the overall performance of the battery such as cycle and long term storage characteristics of the battery, and the like. Further, in the case of using the water soluble polymer alone, adhesive force between the polyolefin based micro-porous film and the coating layer is not sufficient, such that troubles in a battery assembling process and a problem in stability in the battery may be generated.

A separator for non-aqueous electrolyte secondary battery was prepared using carboxylated methyl cellulose (CMC), which is a water soluble polymer, has been disclosed in Japanese Patent Laid-Open Publication No. 2004-227972, but long term lifetime and cycle characteristics are deteriorated due to high water adsorption of the CMC. In addition, the CMC has a property of being easily broken by deformation applied from the outside at the time of mixing an inorganic material, such that a coating layer may be broken or separated by deformation generated during a battery assembling process, which may have an influence on performance and stability of the battery.

A method of modifying a surface of an inorganic material to secure a water resistance property has been disclosed in International Patent Laid-Open Publication No. WO2008/029922. However, in this method, in view of processes, economic efficiency is decreased since a large amount of energy is consumed in order to volatilize water, which is a solvent used in this method, and additional time and energy are used in order to react a surface modifier treated onto the inorganic material. Further, since a surfactant should be used in order to disperse the modified inorganic material in a water solvent again, the remaining surfactant may have a negative influence on characteristics of the battery.

RELATED ART DOCUMENT

Patent Document (Patent Document 1) Korean Patent Laid-Open Publication No. 2007-0080245 (Aug. 9, 2007)
(Patent Document 2) International Patent Laid-Open Publication No. WO2005/049318 (Jun. 2, 2005)
(Patent Document 3) Japanese Patent Laid-Open Publication No. 2002-355938 (Dec. 10, 2002)
(Patent Document 4) Japanese Patent Laid-Open Publication No. 2004-227972 (Aug. 12, 2004)
(Patent Document 5) Japanese Patent Laid-Open Publication No. 2005-276503 (Oct. 6, 2005)
(Patent Document 6) International Patent Laid-Open Publication No. WO2008/029922 (Mar. 13, 2008)

SUMMARY OF THE INVENTION

Technical Problem

An object of the present invention is to provide a micro-porous hybrid film capable of minimizing a water content, improving a water resistance property, and securing high quality uniformity and product stability by using a polymer converted from a water soluble state into a water insoluble state through a drying and aging process.

Another object of the present invention is to provide a high heat resistance micro-porous hybrid film capable of simplifying a process and improving heat resistance and stability in a non-aqueous electrolyte. Still another object of the present invention is to provide a high heat resistance micro-porous hybrid film capable of simultaneously securing a heat resistance property and high permeability by mixing an inorganic material.

Technical Solution

The present inventors studied in order to achieve the object of the present invention and found that a micro-porous hybrid film having excellent stability against water may be provided by using a resin capable of being present as a water soluble polymer in the presence of an alkali component and being converted into a water insoluble polymer through a drying and aging process for removing the alkali component after the water soluble polymer is dried to form a coating layer, thereby completing the present invention.

In one general aspect, a micro-porous hybrid film includes a coating layer formed to include a polymer including a maleic anhydride group on one surface or both surfaces of the micro-porous film.

The polymer including the maleic anhydride group may be a copolymer of one or at least two monomers selected from isobutylene, ethylene, methylvinylether, styrene, and octadecene monomers and maleic anhydride.

The polymer including the maleic anhydride group may be dissolved in water in the presence of an alkali component.

The alkali component may be ammonia.

The alkali component may be used in order to dissolve the polymer including the maleic anhydride group in water and removed after drying and aging.

The coating layer may be made of only the polymer or composed to include the polymer, an inorganic particle, an organic particle, or a mixed particle of the inorganic and organic particles.

The inorganic particle may be any one or at least two selected from alumina, aluminum hydroxide, silica, barium titanium oxide, magnesium oxide, magnesium hydroxide, clay, titanium oxide, glass powder, and boehmite, and the organic particle may be any one or at least two selected from polyvinylidenefluoride (PVdF), polytetrafluoroethylene (PTFE), polyurethane, polymethylpentene (PMP), polyethylene terephthalate (PET), polycarbonate (PC), polyester, polyvinylalcohol (PVA), polyacrylonitrile (PAN), polymethyleneoxide (PMO), polymethylmethacrylate (PMMA), polyethyleneoxide (PEO), polyamide (PA), polyamideimide (PAI), polysulfone (PS), polyethylsulfone (PES), polyarylate (PAR), polyimide (PI), polyaramid (PA), cellulose, and copolymers thereof.

The inorganic or organic particle may have an average particle size of 0.1 to 5 µm.

The coating layer may further include a polymer having a Tg of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), and copolymers thereof.

The coating layer may have a dried coating thickness of 1 to 10 µm and adhesive force of 0.5 Kgf/cm2 or more.

A contact angle of the coating layer may satisfy the following Equation 1.

90°≤initial contact angle

70°≤contact angle after 30 seconds   [Equation 1]

A water content of the micro-porous hybrid film may be 250 ppm/μm or less, a shrinkage ratio thereof at 130° C. in machine and transverse direction may be 5% or less, and gas permeability (Gurley) may be 50 to 1000 sec.

In another general aspect, a method for preparing a micro-porous hybrid film, the method includes:

a) dissolving a copolymer of one or at least two monomers selected from isobutylene, ethylene, methylvinylether, styrene, and octadecene monomers and maleic anhydride in water in the presence an alkali component to prepare a water soluble polymer composition;

b) coating and primarily drying the water soluble polymer composition onto one surface or both surfaces of a micro-porous film to form a coating layer; and c) secondarily drying and aging the coating layer to remove the alkali component.

In step a), the alkali component may be ammonia.

In step a), at the time of preparing the water soluble polymer composition, an inorganic particle, an organic particle, or a mixed particle of the inorganic and organic particles may be further added.

In step a), at the time of preparing the water soluble polymer composition, a polymer having a Tg of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), and copolymers thereof is further added.

Advantageous Effects

According to the present invention, the micro-porous hybrid film for a high output/high capacity battery capable of satisfying the above-mentioned properties and having an excellent water resistance property and quality stability may be provided.

BRIEF DESCRIPTION OF THE DRAWINGS

The above and other objects, features and advantages of the present invention will become apparent from the following description of preferred embodiments given in conjunction with the accompanying drawings, in which.

DESCRIPTION OF THE INVENTION

Best Mode

Figure 1:
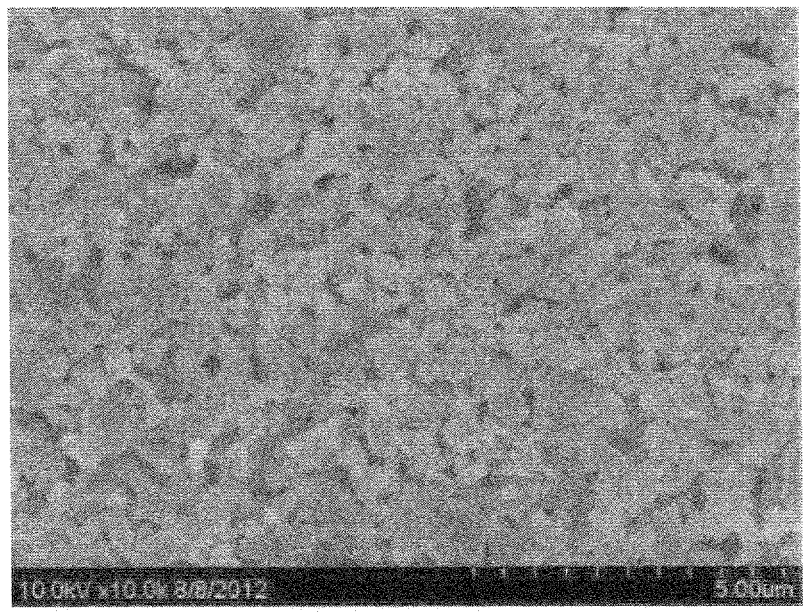
FIG. 1 is an electron microscope photograph of a surface of a coating layer of Example 1.
Figure 2:
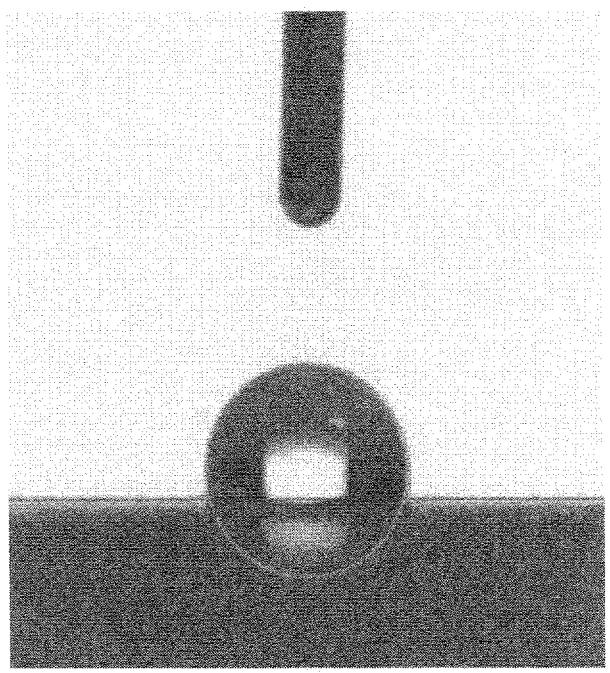
FIG. 2 is a photograph obtained by measuring a contact angle of the coating layer of Example 1.
Figure 3:
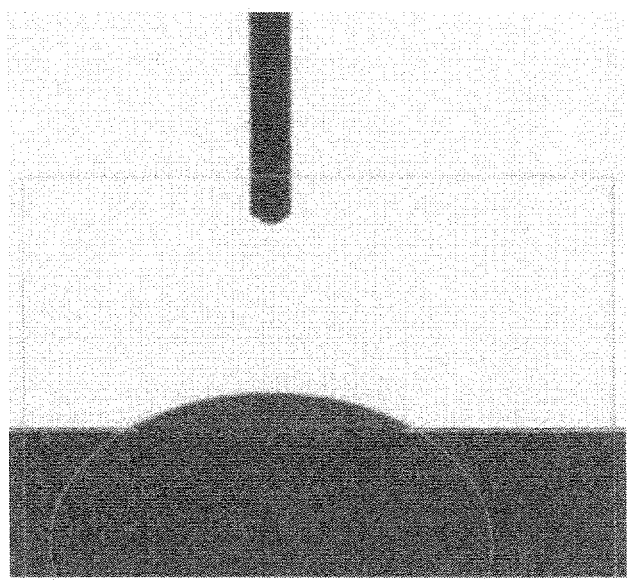
FIG. 3 is a photograph obtained by measuring a contact angle of a coating layer of Comparative Example 2.

Hereinafter, aspects of the present invention will be described in detail.

In one general aspect, the present invention provides a micro-porous hybrid film including a coating layer formed on one surface or both surfaces thereof using a polymer including a maleic anhydride group.

In the present invention, the polymer including the maleic anhydride group is a resin that is dissolved in water to thereby be water soluble in the presence of an alkali component but becomes water insoluble after forming the coating layer and removing the alkali component through a drying and aging process.

In one general aspect of the present invention, as the micro-porous film, any polyolefin based micro-porous film may be used without limitation as long as it is generally used in the art. Further, any porous film such as non-woven fabric, paper, or the like, is not particularly limited as long as it has micro-pores (pores) and may be applied to a battery.

In one general aspect of the present invention, the coating layer may be made of the polymer including the maleic anhydride group alone or simultaneously include the polymer including the maleic anhydride group and particles. As the particle, organic or inorganic particles appropriately selected in order to increase an impregnation property of a separator in a liquid electrolyte, physical strength of the coating layer, porosity of the coating layer, and a heat resistance property of the separator and prevent a short-circuit by securing a space between electrodes at the time of abnormal operation of the battery, or a mixture thereof may be included in the coating layer. A kind of particle is not limited as long as the particle is electrochemically stable in the battery. In detail, as the inorganic particle, for example, alumina, aluminum hydroxide, silica, barium titanium oxide, magnesium oxide, magnesium hydroxide, clay, titanium oxide, glass powder, boehmite, or the like, may be used.

As the organic particle, polyvinylidenefluoride (PVdF), polytetrafluoroethylene (PTFE), polyurethane, polymethylpentene (PMP), polyethylene terephthalate (PET), polycarbonate (PC), polyester, polyvinylaleohol (PVA), polyacrylonitrile (PAN), polymethyleneoxide (PMO), polymethylmethacrylate (PMMA), polyethyleneoxide (PEO), polyamide (PA), polyamideimide (PAI), polysulfone (PS), polyethylsulfone (PES), polyarylate (PAR), polyimide (PI), polyaramid (PA), cellulose, copolymers thereof, and the like, may be used.

Particularly, since the inorganic particle is not deformed by external impact or power due to its rigidity, and thermal deformation of the inorganic particle is not generated at a high temperature of 200° C. or more, the inorganic particle may prevent shrinkage of a base layer generated at a high temperature through binding with the polymer. Further, since the inorganic particle has a porosity of about 40 to 80% due to a structure of particle itself, permeability of a final product may be adjusted by adjusting a ratio of the inorganic particle to a heat resistant resin. A separator simultaneously securing thermal stability while maintaining high permeability may be prepared due to the characteristics as described above.

In the present invention, the organic or inorganic particle may be variously selected according to the purpose, and an average particle diameter thereof may be 0.1 to 5 μm, more preferably 0.1 to 2 μm. In the case in which a diameter of the organic or inorganic particle is less than 0.1 μm, the particle itself may block the pore of a surface of the micro-porous film to decrease permeability, and in the case in which the diameter is more than 5 μm, a thickness of a final separator may become non-uniform, it is difficult to secure an adhesive property with the micro-porous film, and it is impossible to form a coating layer having a dense structure due to a decrease in a surface area, which may deteriorate resistance against deformation such as shrinkage, or the like, such that it may be difficult to secure stability.

A volume of the organic or inorganic particle included in a water soluble polymer composition to be coated onto the micro-porous film may be preferably 30 to 99 volume %, more preferably 60 to 95 volume %. In the case in which the volume of the organic or inorganic particle is less than 30 volume %, the porosity and permeability of the separator may be increased due to a high polymer content, such that the impregnation property of the liquid electrolyte may be deteriorated, and the heat resistance property of the separator may be deteriorated, such that it is difficult to secure the space between the electrodes at the time of abnormal operation of the battery, thereby decreasing stability of the battery. On the contrary, in the case in which the volume is more than 99 volume %, adhesive force with the micro-porous film may be decreased due to a decrease of the polymer content, such that separation of the coating layer may be generated during a slitting and assembling process, thereby decreasing an assembly yield.

In addition, if necessary, additives for improving a specific function such as an oxidation stabilizer, a UV stabilizer, an antistatic agent, and the like, may be added in a range in which characteristics of the separator are not significantly deteriorated.

In one general aspect of the present invention, the polymer including the maleic anhydride group may be dissolved in water in the presence of the alkali component.

As the alkali component, ammonia may be used. The alkali component is used in order to dissolve the polymer in water, and a water insoluble polymer is converted into a water soluble polymer by the alkali component. Thereafter, the alkali component is removed in a drying and aging step, such that the water soluble polymer may be converted into the water insoluble polymer. A content of ammonia used as the alkali component may be 3 to 30 parts by weight based on 100 parts by weight of a solid content of the polymer including the maleic anhydride group. In the case in which the content is less than 3 parts by weight, the polymer may not be dissolved in water, and in the case in which the content is more than 30 parts by weight, a pH of a solution is increased, such that there is a limitation in using the solution, and problems in using ammonia together with the particle or another additive, such as precipitation, or the like, may be generated.

In detail, the polymer including the maleic anhydride group may be any one selected from a copolymer of one or at least two monomers selected from isobutylene, ethylene, methylvinylether, styrene, and octadecene monomers, and maleic anhydride represented by the following Chemical Formula 1; and a copolymer including alkali salts of maleic acid, or a, copolymer including a mixture thereof.

In detail, a commercialized example includes ZEMAC prepared by VERTELLUS Specialties Inc., ISOBAM series prepared by KURARAY Co. Ltd., POLYANHYDRIDE RESINS prepared by CHEVRON PHILLIPS Chemical Com., and the like, but the present invention is not limited thereto.

[Chemical Formula 1]

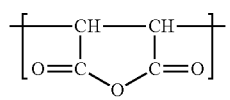

In more detail, maleic anhydride of Chemical Formula 1 is a hydrophobic material, but may be present in a salt form in the presence of alkali (ammonia) as shown in the following Reaction Formula 1 to thereby be dissolved in water, and water and alkali are removed in the drying and aging step after coating as shown in the following Reaction Formula 2, such that the dissolved maleic anhydride returns to the compound of Chemical Formula 1 to thereby have hydrophobicity.

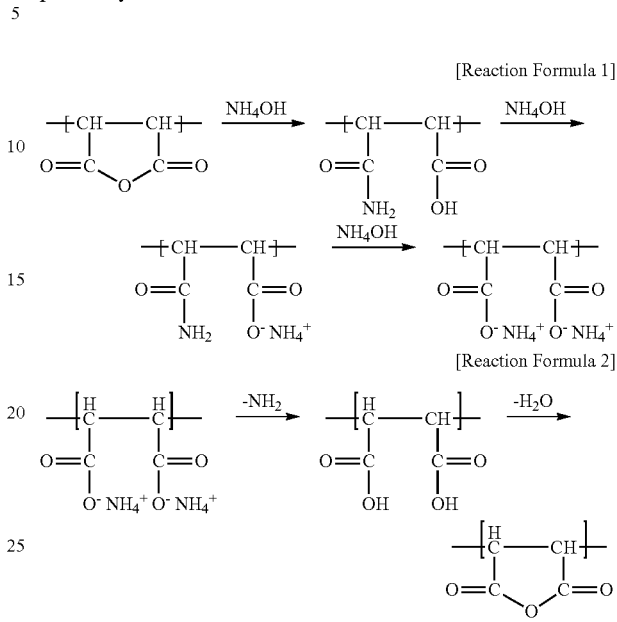

[Reaction Formula 1]

[Reaction Formula 2]

In the case of using the polymer including the maleic anhydride group, since the polymer is present in a carboxylate form in the presence of the alkali component, a water soluble polymer composition having excellent dispersibility and dispersion stability may be prepared without using a dispersant, and electrochemical side reactions according to the addition of the dispersant may be prevented.

In addition, the copolymer including the alkali salt of maleic acid may be dissolved in water, and water and the alkali salt are removed in the drying and aging step after coating to form the maleic anhydride group as described above, thereby making it possible to prepare a coating layer having hydrophobicity. In this case, the alkali salt includes ammonium salts, and the like.

The polymer including the maleic anhydride group may have a weight average molecular weight of preferably 10,000 to 300,000, and more preferably, 30,000 to 250,000. In the case of using a polymer having a weight average molecular weight less than 10,000, a binding property of a final product may be decreased, and gel may be formed due to high reactivity in a solution state, such that a problem in dispersion stability may be generated, and in the case of using a polymer having a weight average molecular weight more than 300,000, a viscosity is high, such that dispersion of the particle is not appropriately performed, and a problem may be generated during a coating process of a base material.

In the micro-porous hybrid film according to the present invention, a coating thickness after drying the coating layer may be 0.5 to 10, more preferably 1 to 7 μm. In the case in which the coating thickness is less than 0.5 μm, it is difficult to secure the heat resistance property, and a space for imparting stability is insufficient, such that stability of the battery may be deteriorated at the time of abnormal behavior of the battery, and in the case in which the coating thickness is more than 10 μm, the thickness of the separator becomes thick, such that permeability is relatively decreased, which generates deterioration of capacity of the battery, and a water content contained in the micro-porous hybrid film is increased, such that performance of the battery may be decreased.

In addition, adhesive force between the coating layer and micro-porous film is a value for an interface between the coating layer and micro-porous film, and the higher the adhesive force, the more preferable. The adhesive force of the micro-porous hybrid film according to the present invention may be 0.5 Kgf/cm2 or more, more specifically 0.5 to 10.0 Kgf/cm2. In the case in which the adhesive force is less than 0.5 Kgf/cm2, separation of the coating layer may be generated during a process requiring winding or unwinding, and particularly, separation is generated in the vicinity of a blade during a slitting process, such that pin holes after winding, non-uniformity of the performance of the battery, and the like, may be generated due to organic/inorganic lumps configuring the separated coating layer.

In order to improve the adhesive force value, if necessary, a polymer having a Tg of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), and polyethyleneoxide (PEO), and copolymers thereof, may be added to the water soluble composition. As the polymer having a Tg of 0° C. or less, styrenebutadienerubber (SBR), acrylate, and butadiene based polymers may be used.

A content of the polymers may be preferably 0 to 15 volume %, more preferably 4 to 10.5 volume %. In the case in which the added content is 15 volume % or more, permeability may be decreased, such that performance of the battery may be deteriorated. Particularly, in the case of using the water soluble polymer such as polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), or the like, the water content may be rapidly increased.

Further, an initial contact angle of the coating layer may be 90° or more, and a contact angle after 30 seconds may be maintained at 70° or more. The contact angle is a value indicating hydrophobic and hydrophilic properties of a surface, and the higher the contact angle, the higher the water resistance property of the surface. In a forming process of the coating layer, before the drying and aging step, the contact angle is 50° or less. The reason is that since the alkali component is not removed, the coating surface does not have a sufficient hydrophobic property. In the case of the coating layer subjected to the drying and aging step, the alkali component is removed, such that the hydrophobic property of the polymer is increased, such that the contact angle becomes 90° or more. In addition, the contact angle after 30 seconds is slightly decreased due to a capillary phenomenon caused by a pore structure of the coating layer itself. However, the contact angle after 30 seconds is decreased to 70° or less, which means that a component having a hydrophilic property is present in the coating layer. Therefore, the contact angle after 30 seconds should be 70° or more. Further, in the case of maintaining the contact angle, since water resistance is excellent, even in the case of dropping a water drop onto the coating layer and rubbing the surface, there is no change in the coating layer. This means that deformation and damage of the coating layer to be generated by water may be blocked.

The micro-porous hybrid film according to the present invention may satisfy the following physical properties: the water content is 250 ppm/μm (thickness of the coating layer) or less, a shrinkage ratio in machine and transverse directions at 130° C. is 5% or less, more specifically, 0 to 5%, and gas permeability (Gurley) is 50 to 1000 sec.

Water reacts with LiPF6 to promote formation of HF, but HF is a material deteriorating performance of the battery. Therefore, a content of water forming HF should be managed so as to be minimized. In addition, the water content is increased according to the thickness of the coating layer, and the reason is that as absolute amount of the particle and polymer configuring the coating layer increase, the water content also increases. However, since when the water content is more than 250 ppm/μm, side reactions in the battery are generated, in order to improve reliability and performance of the battery, the water content needs to be maintained at 250 ppm/μm or less. In order to maintain the water content as described above, the alkali component in the polymer needs to be necessarily removed. The alkali component may be removed through the aging process using dried air and equipment such as infrared (IR), middle infrared (MIR), ultraviolet (UV), electron beam (E-beam), microwave, and the like, at 60 to 140° C. or a higher temperature under conditions at which the micro-porous film does not become deformed. However, it is impossible to remove 100% of elements configuring the alkali component due to bindings between the polymer and the particles, and the like, but when 30% or more of the alkali component is removed, the properties required in the present invention may be secured. Preferably, 40% or more of the alkali component should be removed, and more preferably, 50% or more thereof should be removed. A degree of removal of the alkali component may be measured by a contact angle and nitrogen content measuring method, and the like. It is most preferable that the alkali component used in the present invention is ammonia. The reason is that various salt formations at the end of maleic acid group may be readily converted to the maleic anhydride group while ammonia evaporates at a high temperature. On the contrary, in the case of using a metal salt, evaporation and removal of the metal salt itself is impossible at a high temperature, and there are problems such as productivity deterioration and a yield decrease due to an additional process for removing the metal salt such as a method of precipitation in methanol, or the like.

In the case in which the shrinkage ratio in the machine and transverse directions at 130° C. is more than 5%, the micro-porous hybrid film is contracted at a high temperature, such that a short-circuit between the electrodes may be generated. Therefore, it is preferable that the shrinkage ratio is 5% or less. The shrinkage ratio in the machine and transverse directions at 130° C. in a impregnation state of the electrolyte is 5% or less, which is preferable in view of securing stability and reliability of the battery. When the micro-porous film is impregnated with the electrolyte, in the case of using the non-aqueous polymer including polyvinylidenefluoride (PVdF), polymethylpentene (PMP), polycarbonate (PC), polyethylene terephthalate (PET), polyester, polyacrylonitrile (PAN), polymethyleneoxide (PMO), polymethylmethacrylate (PMMA), polyethyleneoxide (PEO), polyamide, polyamideimide, polysulfone, polyethersulfone, polyaramid, and the like, and copolymers thereof, the non-aqueous polymer is swelled and melted in the electrolyte at a high temperature, such that the non-aqueous polymer may not serve to hold the particle and the micro-porous film. Therefore, the coating layer and the micro-porous film are separated from each other or components configuring the coating layer are dissolved and dispersed in the electrolyte, and as a result, performance of the battery is deteriorated, and heat resistance and stability to be obtained by forming the coating layer is not implemented.

In the case in which the gas permeability is less than 50 sec, since tortuosity of the pores of the micro-porous hybrid film and coating layer is low, there is a problem in stability, and in the case in which the gas permeability is more than 1000 sec, lithium ion transferring capacity may be deteriorated due to low permeability, such that performance of the battery may be deteriorated.

A method for preparing a micro-porous hybrid film according to the present invention is not particularly limited as long as it is generally used in the art. For example, the micro-porous hybrid film may be prepared by the following method.

The method for preparing a micro-porous hybrid film includes:

a) dissolving a copolymer of one or at least two monomers selected from isobutylene, ethylene, methylvinylether, styrene, and octadecene monomers, and maleic anhydride in water in the presence of an alkali component to prepare a water soluble polymer composition;

b) coating and primarily drying the water soluble polymer composition onto one surface or both surfaces of a micro-porous film to form a coating layer; and c) secondarily drying and aging the coating layer to remove the alkali component.

In one general aspect of the present invention, in step a), particles may be further added at the time of preparing the water soluble polymer composition.

In one general aspect of the present invention, in order to further improve adhesion at the time of preparing the water soluble polymer composition, a polymer including styrenebutadienerubber (SBR), acrylate, and butadiene based components having a Tg of 0° C. or less may be added. Alternatively, a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), and polyethyleneoxide (PEO), and copolymers thereof, may be added.

In one general aspect of the present invention, in step b), the micro-porous film may be prepared, for example, through the follow steps (b1) to (b5), but may be prepared by any method known in the art.

The method for preparing a micro-porous film includes:

(b1) melting/kneading/extruding a mixture containing 20 to 50 wt % of polyethylene having a weight average molecular weight of $2.0 \times 10^5$ to $4.5 \times 10^5$ and 50 to 80 wt % of diluents at a phase separation temperature or more to form a thermodynamic single phase in an extruder;

(b2) carrying out phase separation of the melt in a single phase to form the melt into a sheet form;

(b3) stretching the sheet prepared in step (b2) at a stretching ratio of 3.0 times or more in transverse and machine directions, respectively;

(b4) extracting the diluent from the stretched film in a state in which predetermined tension force is applied thereto, and then drying the film; and (b5) heat-setting the film in order to remove residual stress, to reduce a shrinkage ratio of the film.

One surface or both surfaces of the micro-porous film prepared as described above may be coated with the water soluble polymer composition prepared in step a) as described above, thereby forming a coating layer. In the present invention, the micro-porous film including the coating layer formed on one surface or both surfaces thereof as described above is referred to as a "micro-porous hybrid film".

As a coating method in step b), any method may be used as long as the method is widely known in the art. For example, a bar coating method, a rod coating method, a die coating method, a wire coating method, a comma coating method, a micro-gravure/gravure method, a dip coating method, a spray method, an ink jet coating method, a mixing method thereof, a modified method thereof, or the like, may be used. Thereafter, a process of planarizing or partially removing a coating solution of the surface to adjust final coating thickness using a doctor blade, an air knife, a bar, or the like, may be performed. In addition, the coating may be performed by an electrospinning and electrospray method so that the coating layer is formed in a fiber phase to thereby be porous.

In step b), the primary drying means a step of drying a solvent(water) to form a solidified coating film on the micro-porous film and may be performed at 60 to 140° C.

According to the method for preparing a micro-porous hybrid film of the present invention, in step c), the alkali component may be removed through the secondary drying and aging process. The secondary drying means a step for completing the coating layer composed of a water insoluble polymer by removing the alkali component to convert the water soluble polymer into a polymer including the maleic anhydride group. The method is not particularly limited. For example, an air blowing method, a method of using an IR heater, a UV curing method, a method of using E-beam and microwave, or the like, may be used alone, or a combination thereof may be used, and a decompression process may be further performed. In more detail, the drying may be performed at 60 to 140° C., and it is preferable that the drying is performed at a higher temperature as long as the micro-porous film is not damaged.

Hereinafter, the present invention will be described through the following Examples. However, the following Examples are to illustrate the present invention, and the scope of the present invention is not limited to the following Examples.

Various properties of the micro-porous hybrid film according to the present invention were evaluated by the following test methods.

1) Thickness

As a contact type thickness gauge having the precision of 0.1 μm, TESA-μHITE was used.

2) Thickness of Coating Layer

In the case in which a coating layer was formed on a surface of a micro-porous film, a thickness of the micro-porous film was measured before and after coating, and a coating thickness after drying the coating layer was calculated from a change in the measured thickness. In addition, a cross-section was cut by microtoming, and the cross-section was observed using an electron microscope, thereby measuring the thickness.

3) Particle Size

The particle size was analyzed using S3500 (Microtrac Co.) capable of analyzing a particle having a size of 0.02 to 2,000 μm using laser diffraction analysis. If necessary, the particle size was measured from an electron microscope photograph of the surface of the film.

4) Gas Permeability (Gurley)

The gas permeability was measured using Gurley densometer (Toyoseiki Co.). A time (sec) required for passing air having a predetermined volume (100 ml) at a predetermined pressure (about 1 to 2 psig) through a predetermined area (1 in 2) was measured.

(5) Shrinkage Ratio a. The micro-porous film was left in an oven at 130° C. for 1 hour so as to be freely contracted, and then shrinkage in machine and transverse directions was measured, thereby calculating a shrinkage ratio (%).

b. After the micro-porous film having a size of 5 cm×10 cm was put into a vial filled with an electrolyte (Polycarbonate 1M LiPF6) and left in an oven at 130° C. for 1 hour so as to be contracted, the left micro-porous film was washed with dimethylcarbonate and ethanol, and then shrinkage was measured, thereby calculating a shrinkage ratio (%).

Shrinkage ratio (%)=(initial length before heating–changed length after heating)×100/initial length before heating   [Mathematical Equation]

6) Adhesive Force

The adhesive force was measured using UTM 3345 (INSTRON Co.). In detail, a double sided tape (3M) was attached between plates, and the micro-porous hybrid film was inserted between the plates to thereby be attached to a lower tape, and then the coating layer was attached by adjusting an upper plate to which the tape was attached. Thereafter, the adhesive force was measured while pulling the upper plate at a rate of 250 mm/min.

Adhesive force [Kgf/cm2]=measured value/area of tape used in upper plate [cm2]   [Mathematical Equation]

7) Water Content (ppm)

a. Measuring sample: After a sample subjected to a drying and aging process was left at 25° C. and a humidity of 80% for 24 hours, the sample was left in a dry room with a dew point of −30° C. or less for 30 minutes to thereby remove water adsorbed in the surface. Then, 0.5 g of the sample was put into a vial for measurement.

b. Measuring method: The water content was measured for 300 seconds by putting the measuring sample in the vial using an 831 KF coulometer (Metrohm Corp.) equipped in a dry room with a dew point of −30° C. or less and dried nitrogen was used as a flow source at a compact oven at 120° C. at a flow rate of 60 mL/min. The measurement was sustained until a water content change rate is decreased to 3 μg/min or less. A suitable solution used in this case was HYDRANAL COULOMAT AG-H (Fluka Corp.).

8) Measurement of Nitrogen Content (ppm)

The nitrogen content was measured using 5 to 30 mg of the micro-porous hybrid film including the coating layer formed thereon and NSX-2100, which is an elemental analyzer. As the measurement conditions, an inlet temperature was 900° C., an outlet temperature was 1000° C., a flow rate of Ar was 300 mL/min, a flow rate of O2 was 300 mL/min, and a measurement time was 800 seconds. The measurement was performed on each sample three times, and then an average value was used.

9) Weight Average Molecular Weight

The molecular weight of the polymer was measured using 1,2,4-trichlorobenzene (TCB) as a solvent at 140° C. by high temperature gel permeation chromatography (GPC, Polymer Lab.), and as a reference sample for measuring a molecular weight, polystyrene was used.

EXAMPLE 1

1) Preparation of Micro-Porous Film 35 weight % of high density polyethylene having a weight average molecular weight of 3.8×105 g/mole and 65 weight % of a diluent obtained by mixing dibutyl phthalate and paraffin oil having a kinematic viscosity of 160 cSt at 40° C. at a weight ratio of 1:1 were mixed with each other. The composition was extruded at 245° C. using a bi-axially compounder mounted with a T-die, passed through a section set to 175° C. to generate phase separation between the polyethylene and the diluent that are present as a single phase, and a sheet was prepared using a casting roll. The prepared sheet was stretched 7 times in each of the machine and transverse directions at a stretching temperature of 127° C. using a two-step biaxial stretching machine. After stretching, a heat setting temperature was 130° C. with a heat setting width became one time, 1.3 times, and 1.2 times in a preheating section, heat-stretching section, and a final heat setting section, respectively. A final thickness of the prepared polyethylene micro-porous film was 9 μm, and gas permeability (Gurley) thereof was 120 sec.

2) Preparation of Water Soluble Polymer Composition 2.0 weight % of an isobutylene copolymer (ISOBAM 10, KURARAY Co. Ltd.) including a maleic anhydride group was put into a stirrer filled with nitrogen together with ion exchanged water and ammonia corresponding to 15 weight % of the weight of the polymer and heated to 90° C., followed by stirring for 8 hours. Foreign materials were removed using a filter (0.45 μm), thereby preparing a water soluble polymer composition. Alumina having an average particle size of 0.5 μm was added to the prepared water soluble polymer composition and milled for 12 hours using a bead mill. Thereafter, acrylic latex (Zeon, AX-9050) having a Tg of −52° C. was added thereto, thereby preparing a final water soluble polymer composition. In this case, 4 volume % of the isobutylene copolymer including the maleic anhydride group (based on a solid content of the polymer), 90 volume % of alumina, and 6 volume % of acrylic latex were used.

3) Preparation of Micro-Porous Hybrid Film

After performing plasma treatment on one surface of the polyolefin based micro-porous film, the water soluble polymer composition prepared by the preparing method as described above was coated by a die coating method, and water was removed using a convection oven at 60° C. Residues and ammonia were removed by a drying and aging process in an oven at 120° C., thereby finally preparing a micro-porous hybrid film having a coating layer having a dried coating thickness of 3 μm.

Physical properties of the prepared micro-porous hybrid film were measured and shown in the following Table 1.

EXAMPLE 2

1) Preparation of Water Soluble Polymer Composition 1.0 weight % of a maleic acid salt type polymer (KURARAY, ISOBAM 104) including amide ammonium salt was mixed with ion exchanged water as the isobutylene copolymer including the maleic anhydride group and stirred at room temperature for 8 hours using a stirrer filled with nitrogen, followed by removal of foreign materials using a filter (0.45 μm), thereby preparing a water soluble polymer composition. Boehmite (AlOOH) having an average particle size of 0.8 μm was mixed with the prepared water soluble polymer composition, and a bead mill was used for 12 hours. Thereafter, polyvinylalcohol (Kuraray, PVA-117) having a saponification value of 99% was added thereto, the stirrer filled with nitrogen was heated to 97° C., and the mixture was stirred for 8 hours, followed by cooling the mixture to room temperature, thereby preparing a final water soluble polymer composition. In this case, 10 volume % of the isobutylene copolymer including the maleic anhydride group, 85 volume % of boehmite, and 5 volume % of polyvinylalchol were used.

2) Preparation of Micro-Porous Hybrid Film

After performing plasma treatment on both surfaces of the same polyolefin based micro-porous film as that in Example 1, the water soluble polymer composition prepared by the preparing method as described above was coated by a dip coating method, and water was removed using a convection oven at 60° C. Residues and ammonia were removed by a drying and aging process in an IR oven at 115° C., thereby finally preparing a micro-porous hybrid film having a coating layer having a dried coating thickness of 1.5 μm at each surfaces and a total dried coating thickness of 3 μm.

Physical properties of the prepared micro-porous hybrid film were measured and shown in the following Table 1.

EXAMPLE 3

1) Preparation of Water Soluble Polymer Composition 2.5 weight % of an amide ammonium salt type polymer (KURARAY, ISOBAM 104) was mixed with ion exchanged water as the isobutylene copolymer including the maleic anhydride group and stirred at room temperature for 8 hours using a stirrer filled with nitrogen, followed by removal of foreign materials using a filter (0.45 μm), thereby preparing a water soluble polymer composition. Aluminium hydroxide (Al(OH)3) having an average particle size of 0.8 μm was mixed with the prepared water soluble polymer composition, and a bead mill was used for 12 hours. In this case, 10 volume % of the isobutylene copolymer including the maleic anhydride group (based on a solid content of the polymer) and 90 volume % of hydrated alumina were used.

2) Preparation of Micro-Porous Hybrid Film

After performing plasma treatment on one surface of the polyolefin based micro-porous film of Example 1, the water soluble polymer composition prepared by the preparing method as described above was coated by a die coating method, and water was removed using a convection oven at 60° C. Residues and ammonia were removed by a drying and aging process in an oven at 110° C., thereby finally preparing a micro-porous hybrid film having a coating layer having a dried coating thickness of 3 μm.

Physical properties of the prepared micro-porous hybrid film were measured and shown in the following Table 1.

EXAMPLE 4

1) Preparation of Water Soluble Polymer Composition 2.0 weight % of isobutylene copolymer including the maleic anhydride group (ISOBAM 04, KURARAY Co. Ltd.) was put into a stirrer filled with nitrogen together with ion exchanged water and ammonia corresponding to 20 weight % of the weight of the polymer and heated to 90° C., followed by stirring for 8 hours. Foreign materials were removed using a filter (0.45 μm), thereby preparing a water soluble polymer composition. Boehmite having an average particle size of 0.8 μm was added to the prepared water soluble polymer composition and milled for 12 hours using a bead mill. Thereafter, acrylic latex (Zeon, AX-9050) having a Tg of −52° C. was added thereto, thereby preparing a final water soluble polymer composition. In this case, 9.5 volume % of the isobutylene copolymer including the maleic anhydride group (based on a solid content of the polymer), 80 volume % of boehmite, and 10.5 volume % of acrylic latex were used.

2) Preparation of Micro-Porous Hybrid Film

After performing plasma treatment on one surface of the polyolefin based micro-porous film, the water soluble polymer composition prepared by the preparing method as described above was coated by a micro-gravure coating method, and water was removed using a convection oven at 60° C. Residues and ammonia were removed by a drying and aging process in an oven at 120° C., thereby finally preparing a micro-porous hybrid film having a coating layer having a dried coating thickness of 2.5 μm.

Physical properties of the prepared micro-porous hybrid film were measured and shown in the following Table 1.

EXAMPLE 5

1) Preparation of Water Soluble Polymer Composition 1.5 weight % of an amide ammonium salt type polymer (KURARAY, ISOBAM 110) was mixed with ion exchanged water as the isobutylene copolymer including the maleic anhydride group and stirred at room temperature for 8 hours using a stirrer filled with nitrogen, followed by removal of foreign materials using a filter (0.45 μm), thereby preparing a water soluble polymer composition. Alumina hydrate having an average particle size of 0.8 μm was mixed with the prepared water soluble polymer composition, and a bead mill was used for 12 hours. Thereafter, acrylic latex (Zeon, AX-9050) having a Tg of −52° C. was added thereto, thereby preparing a final water soluble polymer composition. In this case, 2 volume % of the isobutylene copolymer including the maleic anhydride group (based on a solid content of the polymer), 94 volume % of alumina hydrate, and 4 volume % of acrylic latex were used.

2) Preparation of Micro-Porous Hybrid Film

After performing plasma treatment on one surface of the polyolefin based micro-porous film, the water soluble polymer composition prepared by the preparing method as described above was coated by a bar coating method, and water was removed using a convection oven at 60° C. Residues and ammonia were removed by a drying and aging process in an oven at 120° C., thereby finally preparing a micro-porous hybrid film having a coating layer having a dried coating thickness of 1.5 μm.

Physical properties of the prepared micro-porous hybrid film were measured and shown in the following Table 1.

COMPARATIVE EXAMPLE 1

1) Preparation of Water Insoluble Polymer Composition 5.0 weight % of polyvinylidenefluoride-hexafluoropropylene (PVDF-HFP, Grade: LBG, ArKema Corp.) and 95 weight % of acetone were stirred for 5 hours while being heated to 40° C. using a stirrer filled with nitrogen, and foreign materials were removed using a filter (0.45 μm), thereby preparing a water insoluble polymer composition. Alumina having an average particle size of 0.6 μm was mixed with the prepared water insoluble polymer composition, and a bead mill was used for 12 hours. In this case, 13 volume % of the polymer and 87 volume % of alumina were used.

2) Preparation of Micro-Porous Hybrid Film

After performing plasma treatment on both surfaces of the polyolefin based micro-porous film of Example 1, the water insoluble polymer composition prepared by the preparing method as described above was coated by a dip coating method, and acetone was removed using a convection oven at 60° C. Residues were removed by a drying and aging process in a vacuum oven at 80° C., thereby finally preparing a micro-porous hybrid film having a coating layer having a dried coating thickness of 2.0/2.0 μm.

Physical properties of the prepared micro-porous hybrid film were measured and shown in the following Table 2.

COMPARATIVE EXAMPLE 2

1) Preparation of Water Soluble Polymer Composition 99 weight % of alumina having an average particle size of 0.5 μm and 1 weight % of a dispersant (BYD, DISPERBYK-180) were stirred in ion exchanged water, and a bead mill was used for about 12 hours, thereby preparing a solution, 2.0 weight % of polyvinylalcohol (Kurary, 117) was mixed with the prepared solution and stirred for 10 hours while being heated to 97° C. using a stirrer filled with nitrogen, followed by removal of foreign materials using a filter (5 μm). Acrylic latex (Zeon, AX-9050) having a Tg of −52° C. was added to the prepared water soluble polymer composition, thereby preparing a final water soluble polymer composition. In this case, 3.8 volume % of the polymer, 89.7 volume % of alumina, 1.2 volume % of the dispersant, and 5.3 volume % of the acrylic latex were used.

2) Preparation of Micro-Porous Hybrid Film

After performing plasma treatment on one surface of the polyolefin based micro-porous film of Example 1, the water soluble polymer composition prepared by the preparing method as described above was coated by a die coating method, and water was removed using a convection oven at 60° C. The remaining solvent was removed by a drying and aging process in an oven at 120° C., thereby finally preparing a micro-porous hybrid film having a coating layer having a dried coating thickness of 3 μm.

Physical properties of the prepared micro-porous hybrid film were measured and shown in the following Table 2.

COMPARATIVE EXAMPLE 3

1) Preparation of Water Soluble Polymer Composition

After 1.0 weight % of carboxymethylcellulose (Daicel, 1220) was mixed with ion exchanged water and stirred for 10 hours using a stirrer filled with nitrogen, foreign materials were removed using a filter (3.0 μm, followed by adding ion exchanged water, thereby preparing a water soluble polymer composition. Boehmite having an average particle size of 0.8 μm was mixed with the prepared water soluble polymer composition, and a bead mill was used for 12 hours. Thereafter, acrylic latex (Zeon, AX-9050) having a Tg of −52° C. was added thereto, thereby preparing a final water soluble polymer composition. In this case, 4 volume % of the polymer, 85 volume % of boehemite, and 11 volume % of the acrylic latex were used.

2) Preparation of Micro-Porous Hybrid Film

After performing plasma treatment on both surfaces of the polyolefin based micro-porous film of Example 1, the water soluble polymer composition prepared by the preparing method as described above was coated by a dip coating method, and water was removed using a convection oven at 60° C. The remaining solvent was removed by a drying and aging process in an oven at 120° C., thereby finally preparing a micro-porous hybrid film having a coating layer having a dried coating thickness of 4 μm (2 μm/2 μm).

Physical properties of the prepared micro-porous hybrid film were measured and shown in the following Table 2.

COMPARATIVE EXAMPLE 4

The fluoro coating was further performed in order to improve water repellency, as compared to Comparative Example 3. In this case, as a fluoro coating solution, a dilute solution was prepared using EGC-1700 (3M) and HFE-7100 (3M). A ratio of EGC-1700 to HFE-7100 in the prepared fluoro coating solution was 5:1 weight ratio. After the micro-porous hybrid film prepared in Comparative Example 3 was immersed in the prepared fluoro coating solution for 1 minute and picked out, the micro-porous hybrid film was dried using a convection oven at 60° C.

Physical properties of the prepared micro-porous hybrid film were measured and shown in the following Table 2.

COMPARATIVE EXAMPLE 5

The micro-porous hybrid film was prepared by the same method in Example 1 except for omitting the aging process.

Physical properties of the prepared micro-porous hybrid film were measured and shown in the following Table 2.

COMPARATIVE EXAMPLE 6

The micro-porous hybrid film was prepared by the same method in Example 1 except for using 30 weight % of NaOH instead of ammonia. Finally, a micro-porous hybrid film having a coating layer having a dried coating thickness of 3.0 μm was prepared.

Physical properties of the prepared micro-porous hybrid film were measured and shown in the following Table 1.

TABLE 1

|  | Example 1 | Example 2 | Example 3 | Example 4 | Example 5 |
|---|---|---|---|---|---|
| Kind of polymer 1 | ISOBAM 10 | ISOBAM 104 | ISOBAM 104 | ISOBAM 04 | ISOBAM 110 |
| Polymer 1 content (wt %) | 2% in water | 1% in water | 2.5% in water | 2% in water | 1.5% in water |
| Volume ratio (%) of polymer 1 to solid content | 4% | 10% | 10% | 9.5% | 2% |
| Kind of alkali | Ammonia (15%) |  |  | Ammonia (20%) |  |
| Kind of solvent | Water | Water | Water | Water | Water |
| Kind of polymer 2 | Acrylic latex | PVA | — | Acrylic latex | Acrylic latex |
| Volume ratio (%) of polymer 2 to solid content | 6% | 5% | — | 10.5% | 4% |
| Kind of particle | $Al_2O_3$ | AlOOH | $Al(OH)_3$ | AlOOH | $Al(OH)_3$ |
| Average particle size (μm) | 0.5 | 0.8 | 0.8 | 0.8 | 0.8 |
| Volume ratio (%) of particle to solid content | 90% | 85% | 90% | 80% | 94% |
| Kind of coating | Die | Dip | Die | Micro-gravure | Bar |

TABLE 1-continued

|  | Example 1 | Example 2 | Example 3 | Example 4 | Example 5 |
|---|---|---|---|---|---|
| Coating thickness (μm) | 3 | 3 (1.5/1.5) | 3 | 2.5 | 1.5 |
| Curley (s) | 152 | 175 | 167 | 220 | 135 |
| shrinkage MD at 130° C. | 1.2 | 0.6 | 1.5 | 2.5 | 3.7 |
| shrinkage TD at 130° C. | 0.5 | 0.3 | 1.2 | 3.2 | 4.2 |
| Initial contact angle | 104 | 91 | 98 | 97 | 95 |
| Contact angle after 30 sec | 102 | 76 | 92 | 93 | 91 |
| Adhesive force (Kgf/cm$^2$) | 1.9 | 2.1 | 0.7 | 3.5 | 1.5 |
| Water content (ppm/μm) | 200 | 226 | 174 | 162 | 193 |

As shown in Table 1, it may be appreciated that in the micro-porous hybrid films of Examples according to the present invention, shrinkage was small, the contact angle was high, adhesive force was excellent, and the water content was low.

Therefore, it may be appreciated that the micro-porous hybrid films are suitable for being used as a separator of a battery.

It may be appreciated that in Comparative Example 3, the contact angle was not possibly measured due to its low contact angle value, and the water content was significantly high.

In Comparative Example 4, the material capable of increasing water repellency was secondarily coated, such that the contact angle was significantly increased, but the water content was not decreased.

TABLE 2

|  | Comparative Example 1 | Comparative Example 2 | Comparative Example 3 | Comparative Example 4 | Comparative Example 5 | Comparative Example 6 |
|---|---|---|---|---|---|---|
| Kind of polymer 1 | PVDF-HFP | PVA 117 | CMC | CMC | ISOBAM 10 | ISOBAM 10 |
| Polymer 1 content (wt %) | 5 | 2% in water | 1% in water | 1% in water | 2% in water | 2% in water |
| Volume ratio (%) of polymer 1 to solid content | 13% | 3.8% | 4% | 4% | 4% | 4% |
| Kind of alkali | — | — | — | — | Ammonia (15%) | NaOH (30%) |
| Kind of solvent | Acetone | Water | Water | Water | Water | Water |
| Kind of polymer 2 | — | Acrylic latex | Acrylic latex | Acrylic latex | Acrylic latex | Acrylic latex |
| Volume ratio (%) of polymer 2 to solid content | — | 5.3% | 11% | 11% | 6% | 6% |
| Kind of particle | $Al_2O_3$ | $Al_2O_3$ | AlOOH | AlOOH | $Al_2O_3$ | $Al_2O_3$ |
| Average particle size (μm) | 0.6 | 0.5 | 0.8 | 0.8 | 0.5 | 0.5 |
| Volume ratio (%) of particle to solid content | 87% | 89.7% | 85% | 85% | 90% | 90% |
| Kind of coating | Dip | Die | Dip | Dip + EGC-1720 | Die | Die |
| Coating thickness (μm) | 2.0/2.0 | 3 | 4 (2.0/2.0) | 4 (2.0/2.0) | 3 | 3 |
| Curley (s) | 283 | 156 | 171 | 182 | 152 | 152 |
| shrinkage MD at 130° C. | 7 | 1.4 | 0.3 | 0.3 | 1.2 | 0.9 |
| shrinkage TD at 130° C. | 14 | 0.5 | 0.5 | 0.5 | 0.5 | 0.7 |
| Initial contact angle | 105 | 25 | NG | 67 | 44 | 30 |
| Contact angle after 30 sec | 102 | 20 | NG | 60 | 38 | 26 |
| Adhesive force (Kgf/cm$^2$) | 0.4 | 2.2 | 0.6 | 0.6 | 1.9 | 2 |
| Water content (ppm/μm) | 84 | 428 | 620 | 590 | 350 | 520 |

As shown in Table 2, in Comparative 1, the contact angle was excellent by using the water insoluble resin, but adhesive force was low, and a swelling phenomenon of the water insoluble resin in the electrolyte was generated.

It may be appreciated that in Comparative Example 2, the contact angle was low, and the water content was significantly high.

In Comparative Example 5, since the micro-porous hybrid film had the coating layer formed to include the polymer including the maleic anhydride group but the drying and aging process was not performed, there was a problem in the water content.

In Comparative Example 6, since the micro-porous hybrid film had the coating layer formed to include the polymer including the maleic anhydride group but NaOH was used as the alkali component, NaOH was not removed by the drying and aging process, such that the polymer had the hydrophilic property as it is. Therefore, there was a problem in the water content.

The invention claimed is:

1. A method for preparing a micro-porous hybrid film comprising a coating layer formed on one surface or two surfaces of the micro-porous film, the method comprising:
   a) dissolving a water-insoluble copolymer of maleic anhydride and at least one monomer selected from the group consisting of isobutylene, ethylene, methylvinylether, styrene, and octadecene as its alkali salt form in water in the presence of an alkali component, thereby preparing a water soluble polymer composition;
   b) coating the water soluble polymer composition on one surface or two surfaces of the micro-porous film to form the coating layer, and primarily drying the coating layer; and
   c) secondarily drying and aging the coating layer, thereby removing the alkali component and including the water insoluble copolymer in the coating layer.

2. The method of claim 1, wherein in step a), the alkali component is ammonia.

3. The method of claim 1, wherein in step a), at the time of preparing the water soluble polymer composition, an inorganic particle, an organic particle, or a mixed particle of the inorganic and organic particles is further added.

4. The method of claim 1, wherein in step a), at the time of preparing the water soluble polymer composition, a polymer having a $T_g$ of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), and copolymers thereof is further added.

5. The method of claim 2, wherein in step a), at the time of preparing the water soluble polymer composition, a polymer having a $T_g$ of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), and copolymers thereof is further added.

6. The method of claim 3, wherein in step a), at the time of preparing the water soluble polymer composition, a polymer having a $T_g$ of 0° C. or less; or a water soluble polymer selected from polyvinylalcohol (PVA), polyacrylic acid (PAA), polyvinylpyrrolidone (PVP), polyacrylamide (PAAm), polyvinylacetate (PNVA), carboxymethylcellulose (CMC), polyethyleneoxide (PEO), and copolymers thereof is further added.

* * * * *